US009059915B2

(12) United States Patent
Morandin (10) Patent No.: US 9,059,915 B2
(45) Date of Patent: Jun. 16, 2015

(54) MULTICAST REPLICATION SKIP (75) Inventor: Guglielmo Marco Morandin, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 26 days.

(21) Appl. No.: 13/601,373

(22) Filed: Aug. 31, 2012

(65) Prior Publication Data
US 2014/0064081 A1  Mar. 6, 2014

(51) Int. Cl.
*H04L 12/24* (2006.01)
*H04L 12/26* (2006.01)
*H04L 12/801* (2013.01)
*H04L 12/835* (2013.01)
*H04L 12/823* (2013.01)

(52) U.S. Cl.
CPC ............ *H04L 43/0882* (2013.01); *H04L 47/12* (2013.01); *H04L 47/15* (2013.01); *H04L 47/30* (2013.01); *H04L 47/32* (2013.01)

(58) Field of Classification Search
CPC ...... H04L 47/10; H04L 47/2425; H04L 47/41
USPC .................................................. 370/235, 230
See application file for complete search history.

(56) References Cited

U.S. PATENT DOCUMENTS

| | | | |
|---|---|---|---|
| 6,256,675 B1 * | 7/2001 | Rabinovich | 709/241 |
| 6,430,153 B1 * | 8/2002 | Hughes et al. | 370/230.1 |
| 6,603,772 B1 | 8/2003 | Moussavi et al. | |
| 6,654,363 B1 * | 11/2003 | Li et al. | 370/338 |
| 6,717,945 B1 | 4/2004 | Jue et al. | |
| 6,751,219 B1 * | 6/2004 | Lipp et al. | 370/390 |
| 6,775,280 B1 | 8/2004 | Ma et al. | |
| 6,999,453 B1 | 2/2006 | Chemla et al. | |
| 7,519,054 B2 | 4/2009 | Varma | |
| 7,675,857 B1 * | 3/2010 | Chesson | 370/235 |
| 7,859,999 B1 * | 12/2010 | Basu et al. | 370/230 |

(Continued)

FOREIGN PATENT DOCUMENTS

| | | | |
|---|---|---|---|
| EP | 0661851 B1 | 7/1995 | |
| EP | 1133110 A2 | 9/2001 | |
| WO | WO2004023718 A2 | 3/2004 | |
| WO | WO2012004689 | * 1/2012 | H04L 12/56 |

OTHER PUBLICATIONS

Deng Pan et al, FIFO-Based Multicast Scheduling Algorithm for Virtual Output Queued Packet Switches, Oct. 2005, vol. 54, IEEE Transactions on Computers.

(Continued)

*Primary Examiner* — Asad Nawaz
*Assistant Examiner* — Parth Patel
(74) *Attorney, Agent, or Firm* — Lempia Summerfield Katz LLC (57) ABSTRACT

In one implementation, the volumes of the queues in a network device are monitored to identify ports that are congested or near congestion. In another implementation, an auxiliary queue or counter is used to measure the long term congestion or predict future congestion. The auxiliary queue includes a counter that tracks the occupancy of the queue through a service rate that is less than the service rate of the queue. The service rate of the queue may be the data rate at which data leaves the queue. The service rate of the counter or auxiliary queue may be the speed at which the value of the counter changes. Forced packet dropping may be applied to packets destined to queues associated with a counter that exceeds a threshold.

16 Claims, 7 Drawing Sheets

(56) References Cited

U.S. PATENT DOCUMENTS

| | | | |
|---|---|---|---|
| 8,189,476 B1 | 5/2012 | Rothstein et al. | |
| 2002/0085578 A1 | 7/2002 | Dell et al. | |
| 2002/0118689 A1 | 8/2002 | Luijten et al. | |
| 2003/0021282 A1* | 1/2003 | Hospodor | 370/401 |
| 2003/0058802 A1 | 3/2003 | Jones et al. | |
| 2003/0058880 A1* | 3/2003 | Sarkinen et al. | 370/413 |
| 2003/0179759 A1 | 9/2003 | Wang | |
| 2004/0109412 A1 | 6/2004 | Hansson et al. | |
| 2006/0045008 A1* | 3/2006 | Sun et al. | 370/229 |
| 2007/0076621 A1 | 4/2007 | Malhotra et al. | |
| 2007/0195761 A1* | 8/2007 | Tatar et al. | 370/389 |
| 2008/0115128 A1 | 5/2008 | Achanta et al. | |
| 2010/0220742 A1* | 9/2010 | Brewer et al. | 370/412 |
| 2010/0246603 A1* | 9/2010 | Rabie et al. | 370/466 |
| 2011/0051604 A1 | 3/2011 | Nishimura | |
| 2013/0114593 A1* | 5/2013 | Jabr et al. | 370/389 |

OTHER PUBLICATIONS

Devavrat Shah et al., Optimal Scheduling Algorithms for Iput-Queued Switches, 2006, IEEE.

Nick McKeown et al., The Tiny Tera: A Packet Switch Core, 1997, IEEE Micro.

Rajeev Sivaram et al., HIPIQS: A High-Performance Switch Architecture using Input Queuing, Apr. 1998, IEEE Transactions on Parallel and Distributed Systems.

A.S. Tanenbaum, et al., "Computer Networks", Dec. 31, 2011, pp. 246-264, Section 3.4 & 3.4.2, Boston, MA.

International Search Report and Written Opinion, from PCT/US2013/070235, May 23, 2014, WO.

International Search Report and Written Opinion, from PCT/US2013/072760, May 22, 2014, WO.

International Search Report and Written Opinion, from related PCT Application No. PCT/US2013/069562, Feb. 10, 2014, WO.

Partial International Search Report, from PCT/US2013/072760, Mar. 18, 2014, WO.

Partial Search Report cited in PCT/US2013/070235, mailed Jan. 29, 2014.

Partial Search Report, from PCT/US2014/016176, Jun. 13, 2014, WO.

International Search Report and Written Opinion from, PCT/US2014/016176, Sep. 15, 2014, WO.

* cited by examiner

MULTICAST REPLICATION SKIP

TECHNICAL FIELD

This disclosure relates in general to the field of internet protocol (IP) communication, more particularly, to multicast communication.

BACKGROUND

Multicast relates to the transmission or delivery of a packet, a message, or other information from a single source to a group of destination computers. The bulk of internet traffic is unicast, rather than multicast. Unicast involves data sent to a single destination using a single destination address. Multicast may be implemented in streaming media and internet television applications. In these examples, the implementation of multicast occurs at the IP routing level. Network devices define optimal distribution paths for data sent to multicast destination addresses.

Multicast may be scaled to a large group of recipients without prior knowledge of the identity of individual recipients or how many recipients there are. Multicast uses network infrastructure efficiently by requiring the source to send a packet only once, even if the packet is to be delivered to a large number of recipients. The network devices in the network replicate the packet to reach multiple recipients.

Normally, a network device replicates packets and distributes the replicated packets to egress ports smoothly. However, if one or more ports of the network device become congested, replicated packets are blocked.

BRIEF DESCRIPTION OF THE DRAWINGS

Exemplary embodiments of the present embodiments are described herein with reference to the following drawings.

DESCRIPTION OF EXAMPLE EMBODIMENTS

Overview

In one example, a node receives a flow of incoming packets and replicates the flow of incoming packets for a plurality of egress ports. The replicated packets are received at a real queue of one of the plurality of egress ports and counted in a virtual queue as an indicator of congestion in the real queue.

Example Embodiments

The disclosed embodiments relate to detecting congestion in the output ports of a data switch or router. Congestion occurs at queues that feed each of the output ports. In one implementation, the volumes of the queues are monitored to identify ports that are congested or near congestion. In another implementation, an auxiliary queue or counter is used to measure the long term congestion or predict future congestion. The auxiliary queue includes a counter that tracks the occupancy of the queue through a service rate that is less than the service rate of the queue. The service rate of the queue may be the data rate at which data leaves the queue. The service rate of the counter or auxiliary queue may be the speed at which the value of the counter changes. Forced packet dropping, may be applied to flows destined for queues associated with a counter that exceeds a threshold.

Multicast may be implemented by replicating a received packet for distribution to a set of output ports by way of a set of output queues. A multicast packet includes a label for the multicast group that defines the destinations of the multicast packet. A bitmap (e.g., a fabric port of exit (FPOE) bitmap) may define which of the set of output queues the multicast packet is to be forwarded to in order to reach the destinations.

One or more of the output queues may be full. In such a situation, the received packet is first replicated to the available output queues. A timer is started and replication and/or transmission to the remaining output queues may be repeatedly attempted. Some of the remaining output queues may become available, which allows replicated packets to be received at and forwarded from those queues. However, some of the remaining output queues may not become available before the timer expires. The timer expires in a selectable predetermined amount of time (e.g., 10 milliseconds, 100 milliseconds). The output queues that are not available upon expiration of the timer are skipped, and the corresponding packets are dropped.

One type of congestion causing full input queues is head of line blocking. Head of line blocking occurs when a line of packets is delayed by the first packet in the line. Long term head of line blocking occurs when a rate mismatch persists between the rate at which a multicast flow can be replicated to an output queue and a rate that the multicast flow is received at the input queue. Long term head of line blocking reduces multicast performance. As a result, the input queue may overflow, which causes dropped packets of any multicast flow entering the queue, even the one not directed to congested destinations. Additionally, flow control can cause the blocking to head upstream to one or more other stages in the communication path.

The timer approach to identify congestion and initiate flow control to drop packets causes head of line blocking. Even a single retry to replicate a packet creates delay for subsequent packets. Therefore, relying on a timer causes latency to increase for other multicast flows, and reduces the total multicast volume that can be delivered at outputs due to blocking. The following embodiments omit the timer or include a selectively disabled timer.

Figure 1:
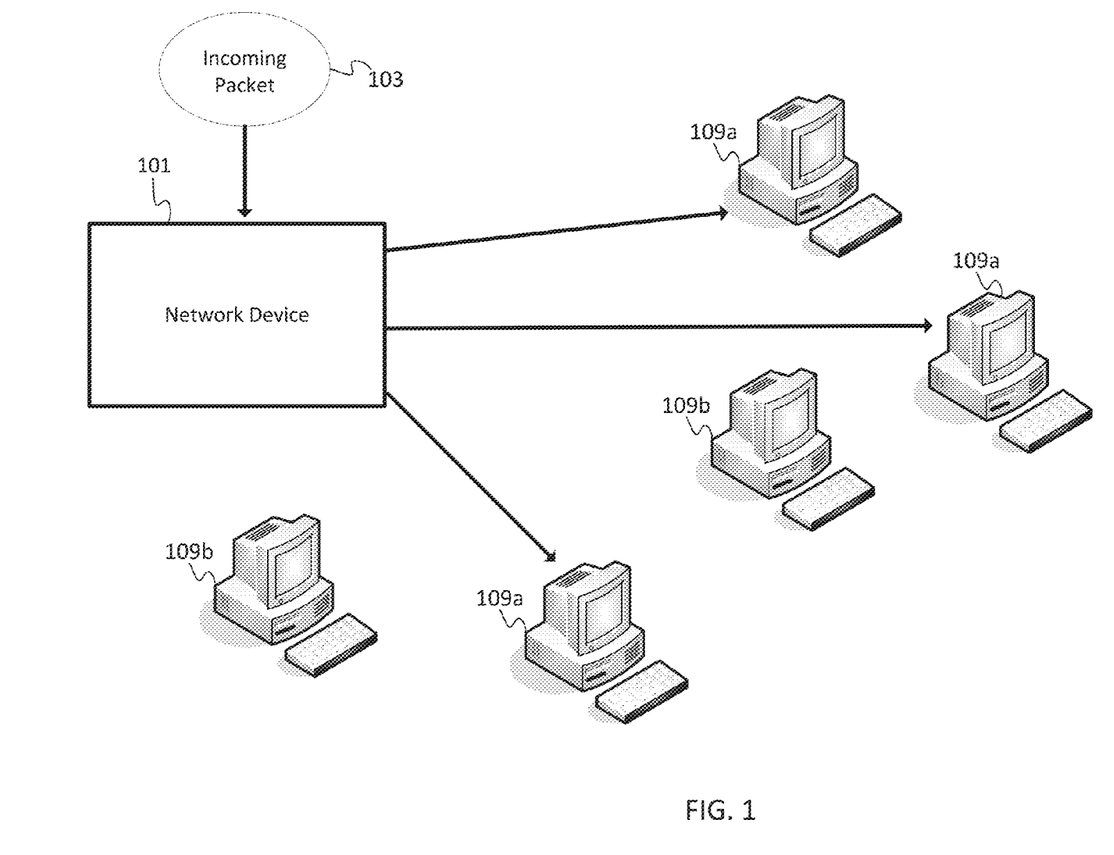
FIG. 1 illustrates an example network configured for multicast communication.

FIG. 1 illustrates an example network configured for multicast communication. The network includes one or more network devices 101 and endpoint computers 109a-b. The network device 101 may be any device capable of replicating and forwarding data packets. Example network devices include routers and switches.

The network device 101 receives the incoming packet 103, consults a forwarding table, and replicates the incoming packet for each of the egress ports assigned to endpoint computers that should receive a copy of the incoming packet. The forwarding table may include a bitmap that maps to a set of endpoints to endpoint computers 109a but does not map another set of endpoint to endpoint computers 109b.

Figure 2:
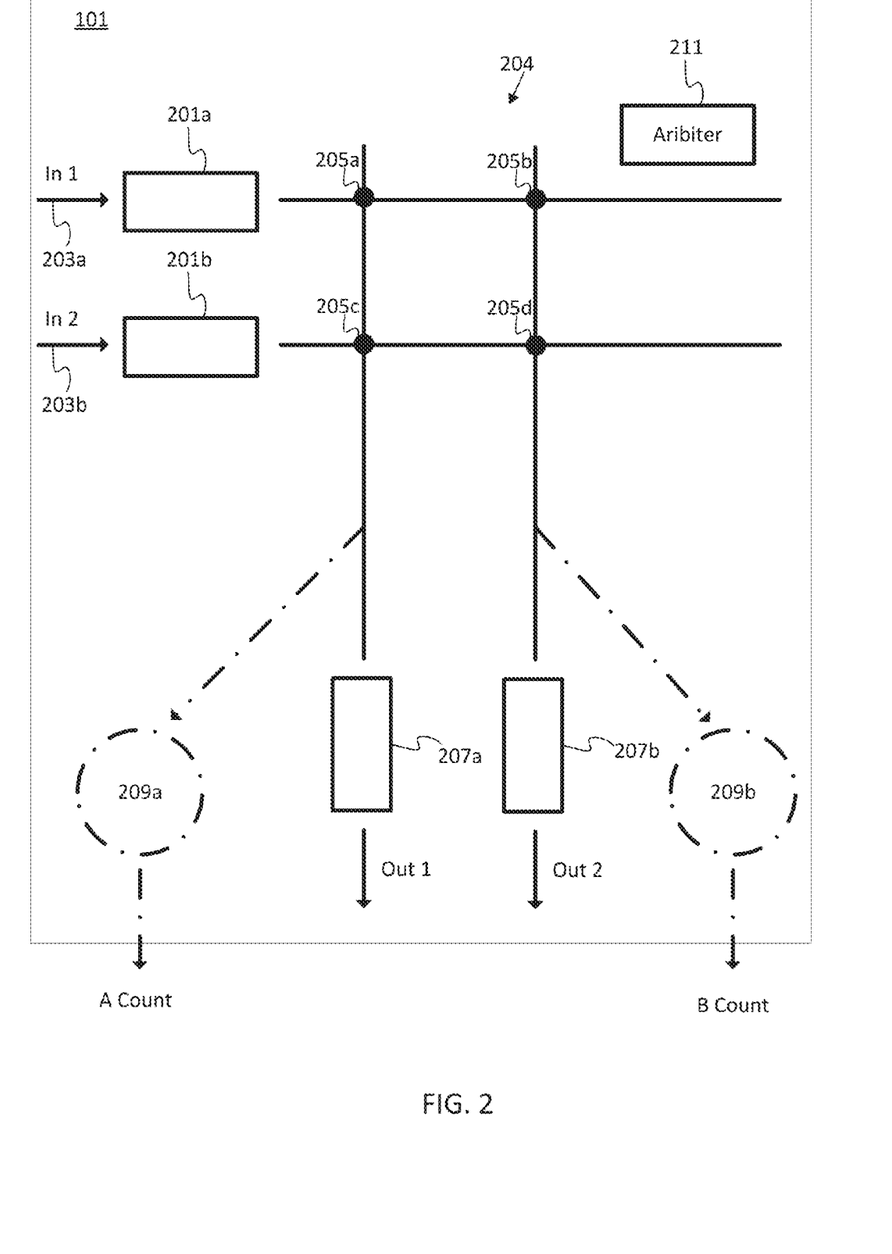
FIG. 2 Illustrates an example network device configured for multicast communication.

FIG. 2 Illustrates an example network device 101 configured for multicast communication. The network device 101 may include one or more integrated circuits programmed or designed to replicate and forward data packets. For example, the network device 101 may include an application specific integrated circuit (ASIC). FIG. 2 is a functional diagram illustrative of such an ASIC. Other devices than ASIC may be used, such as field programmable gate arrays or general processors.

Two ingress ports 203*a-b* are configured to receive incoming data packets. Each of the ingress ports 203*a-b* communicates with an input queue 201*a* or 201*b*. The input queues 201*a-b* may be data stored in memory. The input queues 201*a-b* may be first in first out (FIFO) data structures in which data is kept in order and data is received or enqueued at the first terminal position and sent or dequeued at the last terminal position. Each of the input queues 201*a-b* communicates with a crossbar switch 204.

The crossbar switch 204 comprises connects multiple inputs (e.g., In 1 and In 2) to multiple outputs (e.g., Out 1 and Out 2) in a matrix arrangement. The crossbar switch 204 may be referred to as a cross point switch or a matrix switch. The crossbar switch 204 may connect M inputs and N outputs. Each input is selectably connected to each output. The crossbar switch 204 includes M×N cross points 205*a-d*. The cross points selectably connect the input lines to the output lines. Cross point 205*a* is configured to connect In 1 and Out 1, cross point 205*b* is configured to connect In 1 and Out 2, cross point 205*c* is configured to connect In 2 and Out 1, and cross point 205*d* is configured to connect In2 and Out 2. The crossbar switch 204 may include any number of inputs and any number of outputs. In one example, the cross bar switch 203 may have 10 inputs, 1000 outputs, and 10,000 cross points.

The cross bar switch 203 may include a network of transistors. A pass transistor at each of the cross points may be switched on to connect the potentially intersecting communication paths. When the pass transistor is enabled, the input is connected to the output through the cross point.

In one embodiment, more than one of the cross points 205*a-d* are activated at a time in order to transfer a packet to multiple outputs simultaneously. However, multiple inputs cannot be connected to a single output.

An arbiter 211 prevents multiple inputs from being connected to a single output at the same time. The arbiter 211 is configured to control the cross points 205*a-d*. The arbiter 211 may comprise logic or hardware configured to output a control signal that selectively energizes the cross points 205*a-d*. The control signal may activate or energize a transistor at each cross point. A physical connection (e.g., wire or trace) connects the arbiter 211 to each of the cross points 205*a-d*. The arbiter 211 decides the order that packets are dequeued from the input queues 201*a-b*. In a FIFO arrangement, the arbiter 211 follows the order that the packets arrive in the input queues 201*a-b* as a map to select the appropriate cross point for each packet as the packets are replicated and/or forwarded to the egress ports 207*a-b*.

In some scenarios, a collision of packets can still be avoided when more than one packet is transmitted at a time. In the example of FIG. 2, a packet could be sent from In 1 to Out 1 in overlapping time with a packet sent from In 2 to Out 2. Similarly, a packet could be sent from In 1 to Out 2 in overlapping time with a packet sent from In 2 to Out 1. However, packets could not be simultaneously sent from In 1 to Out 1 and Out 2, from In 2 to Out 1 and Out 2, from In 1 and In 2 to Out 1, or from In 1 and In 2 to Out 2. To avoid collision, the arbiter 211 controls the order. In multicast, the packet may include a label that specifies that the packet to go to both (or all) outputs.

End of line blocking is common in multicast. Consider an example where the next packet in input queue 201*a* and the next packet in input queue 201*b* should be sent to Out 2. The arbiter 211 introduces delay to at least one of the packets because the packets cannot be sent simultaneously. Regardless of which packet is sent first, the first packet blocks the other packet, which may be referred to as head of line blocking.

Head of line blocking can be reduced if the communication paths of the cross bar switch 203 are faster than the communication paths leading up to the input queues and leading away from the output queues. If the internal communication paths are faster, a portion of the delay experienced at the exit of the input queues can be "made up" or recouped by the time the packets reach the output queues. The internal communication paths may be three times faster than the external communication paths.

At one of both of inputs 203*a-b*, the network device 101 receives a flow of incoming packets. The flow of incoming packets may include a sequence of data packets. The data packets include control information (e.g., a label) and a payload. The label may include a destination group label, a source address, a packet identification value, a sequence value, and/or a checksum or other error correcting code. The network device 101 is configured to replicate the flow of incoming packets for multiple egress ports. Replication may include duplication of the data packets and transmission to Out 1 and Out 2.

Each of the egress ports is matched with an output queue 207*a-b*. The output queues 207*a-b* are "real queues." A real queue may be a portion of memory configured to store data packets including both the control information and the payload of the data packets. In other words, real queues store the entire packets.

Each of the egress ports is also matched with a virtual queue 209*a-b*. The virtual queues 209*a-b* are configured to receive the replicated packets. The virtual queues may be any type of queue other than a real queue. That is, the virtual queues do not store both the control information and the payload of the data packet. The virtual queues stores less than the control information and the payload of the data packet. In one implementation, the virtual queues store the packet identification value for the associated data packets. In other implementations, the virtual queues do not store any of the data from the data packets. Instead, the virtual queues may store a count of the number of data packets. Or, the virtual queues may store a count of the amount of data of the data packets. The amount of data may be measures in bytes, kilobytes, megabytes, etc.

The real queues 207*a-b* and the virtual queues 209*a-b* are drained at different rates. The drain rate of a queue is the data rate at which packets or data associated with packets leaves the queues. In one configuration, the drain rate of the real queues 207*a-b* is greater than the drain rate of the virtual queue 209*a-b*. Each of the real queues 207*a-b* is paired with one of the virtual queues 209*a-b*. For example, the input to the real queue 207*a* and the input to the virtual queue 209*a* are related such that the data rate leading to the real queue 207*a* defines the count rate or data rate to the virtual queue 209*a*. However, because the drain rate of the real queue 207*a* is different than the drain rate of the virtual queue 209*a*, the quantity of data in the real queue 207*a* does not necessarily match the count of the virtual queue 209*a*.

Figure 3:
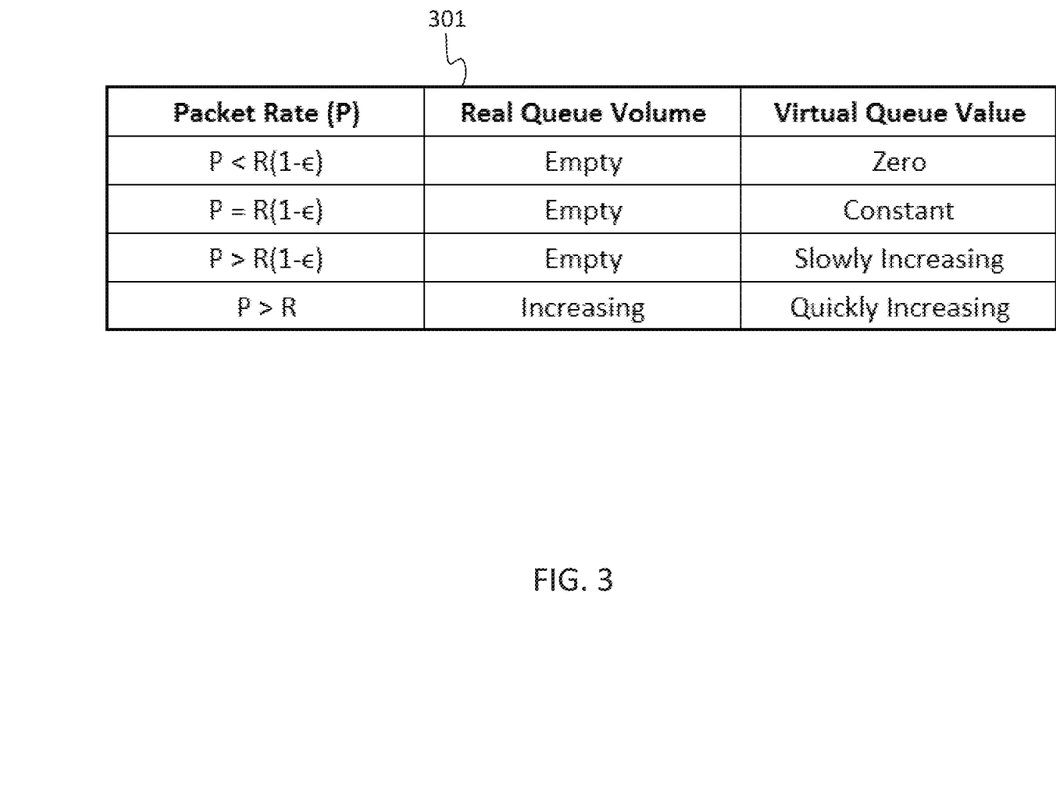
FIG. 3 illustrates an example chart listing packet queues in the network device.

FIG. 3 illustrates a chart 301 listing packet queues in the network device 103. In one example, the data rate of the packets going into the real queue is P. The rate of change of the virtual queue is associated with P. For example, the count of the virtual queue may increase by amounts of data defined by P. The drain of data leaving the real queue is R. R is defined by the speed of the communication path at the output of the real queue. The drain rate of data (or decrement rate of the count value) of the virtual queue is less than R, which may be defined as $R*(1-\epsilon)$, where is $\epsilon$ is a decimal or fractional value between 0 to 1. Example values for $\epsilon$ include $1/4$, $1/8$, $1/16$, Pi/4 (0.785) or $3/5$. Any number between 0 and 1 is possible.

The selection of epsilon $\epsilon$ dictates how the virtual queue varies in time with respect to the real queue. If $\epsilon$ is large, then the network device 101 may detect congestion when no congestion exists or the likely future congestion never exists. If $\epsilon$ is small, then the difference in growth rate between the virtual queue and the real queue is very small. When $\epsilon$ is zero, then the real queue and the virtual queue drain at the same rate. Effectively, the virtual queue, when $\epsilon$ is set to zero, measures the real queue volume as an indication of congestion.

The rates P, R, and $R*(1-\epsilon)$ may refer to instantaneous rates or average rates over a time period. Example time periods include 5 milliseconds, 10 milliseconds, 100 milliseconds, 1 second, and 10 seconds.

Four scenarios are possible. The first row of chart 301 is a scenario when P is less than $R*(1-\epsilon)$. Because P is less than R, no packet data accumulates in the real queue. Because P is less than $R*(1-\epsilon)$, the count value does not increase. Therefore, as shown by chart 301, the real queue volume is empty and the virtual queue value is zero.

The second row of chart 301 is a scenario when P is equal to $R*(1-\epsilon)$. Because P is less than R, no packet data accumulates in the real queue. Because P equals than $R*(1-\epsilon)$, the count value does not increase or decrease. Therefore, as shown by chart 301, the real queue volume is empty, and the count value of the virtual queue is constant.

The third row of chart 301 is a scenario when P is greater than $R*(1-\epsilon)$ and P is less than R. Because P is less than R, no packet data accumulates in the real queue. Because P is greater than $R*(1-\epsilon)$, the count value increases. Therefore, even though no congestion has occurred in the real queue, the virtual queue provides an early warning of potential congestion in the real queue. The count of the virtual queue is an indication of future congestion in the real queue. In addition, the virtual queue may have values related to past congestion of the real queue. Therefore, the virtual queue is an indicator of long term congestion.

The fourth row of chart 301 is a scenario when P is greater than R. Because P is greater than R, the real queue volume increases. The real queue may be congested or may be congested after the amount of time required for the real queue to be full (e.g., 10 milliseconds). Because P is much greater than $R*(1-\epsilon)$, the count value increases at a rate greater than the rate that the count value increased in the scenario of the third row of chart 301. The count value increases at a rate faster than the real queue volume, which provides an indication that the real queue may soon be congested. The count value also provides an indication that the real queue is already congested.

The network device 101 is configured to compare the count value of the virtual queue to a predetermined threshold. The predetermined threshold may be selected such that the threshold indicates that the real queue may soon be congested or is already congested. Example values for the predetermined threshold include any number of kilobytes or megabytes. The predetermined threshold may be defined according to user input. The predetermined threshold may be defined according to user error or historical data.

When the count value of the virtual queue exceeds the predetermined threshold, the network device 101 is configured to drop packets destined for the real queue associated with the virtual queue. The network device 101 is configured to monitor the virtual queues of multiple egress ports.

For example, when a packet arrives at the network device 101, the network device 101 reads the multicast label from the packet. The network device 101 may consult a bitmap to identify egress ports for destinations from the multicast label. The network device 101 accesses virtual queue count values for each of the egress ports, and compares each of the virtual queue count values to a predetermined threshold. For egress ports associated with a virtual queue count value below the predetermined threshold, the network device replicates and forwards the data packet under normal multicast procedures. For egress ports associated with a virtual queue count value above the predetermined threshold, the network device drop the packets destined for those ports, or otherwise does not replicate and/or duplicate packets for those ports. These egress ports may be referred to as failed ports or potentially congested ports. The threshold may depend on the priority of the multicast packets. A higher priority may have a higher threshold than a lower priority. Therefore, when drops are necessary, lower priority packets are dropped preferentially.

In another example, the network device may wait a wait time period (e.g., 1 millisecond) and compare the virtual queue count value of the failed ports or potentially congested ports again. This process may be repeated a small number (e.g., 2 to 10) of times again. Example values for the predetermined threshold include 40 kilobytes, 100 kilobytes, and 1 megabyte. The wait should be inversely proportional to the virtual queue value. In addition, the network device immediately skips packets when the virtual queue count exceeds another threshold, the immediate skip threshold, which is greater than the predetermined threshold.

Figure 4:
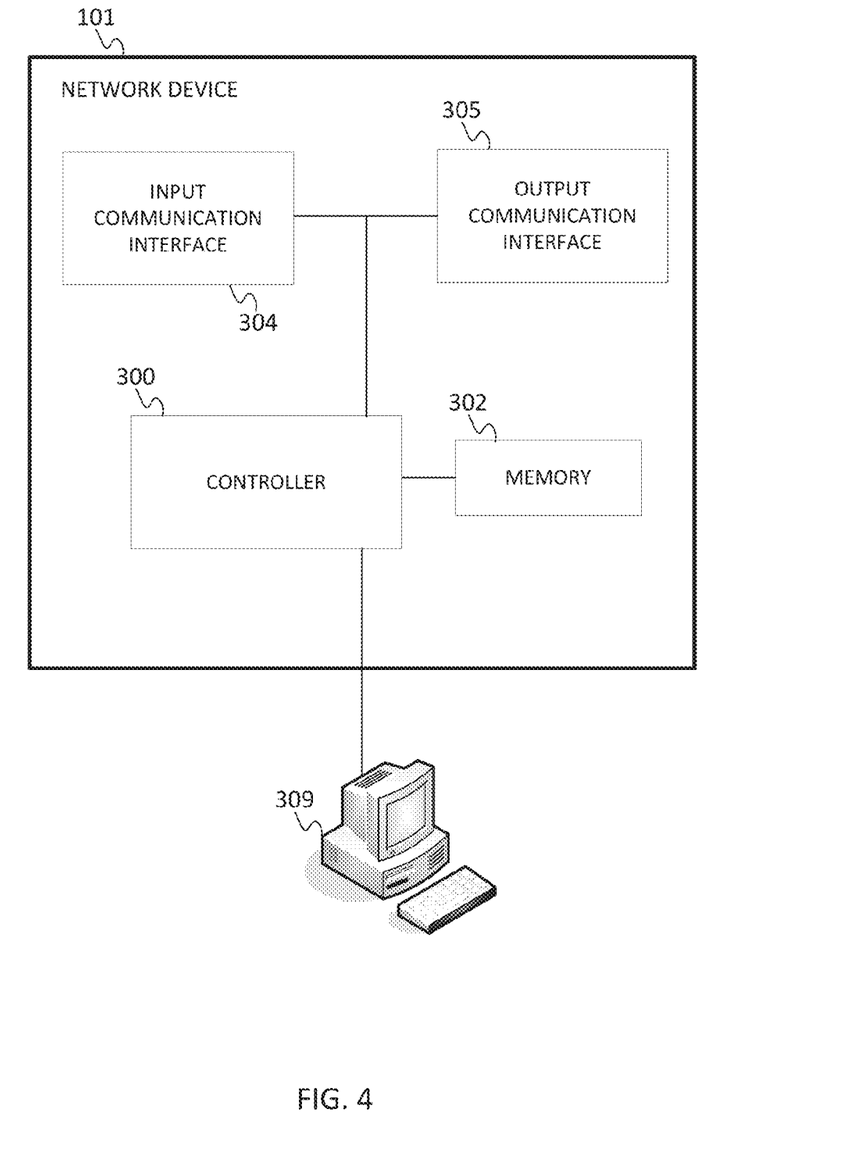
FIG. 4 illustrates an example network device configured for multicast communication.

FIG. 4 illustrates an example network device 101 configured for multicast communication. The network device 101 includes at least a controller 300, a memory 302, an input communication interface 304, and an output communication interface 305. The network device 101 may also communicate with a workstation 309.

The input communication interface 304 may include one or more ingress ports. The input communication interface 304 is configured to receive a sequence of data packets. The sequence of data packets may be encoded for multicast and include a multicast group label or a destination address associated with multiple egress ports. The output communication interface 305 may include the multiple egress ports.

The controller 300 includes logical circuitry or hardware for performing multicast replication and forwarding including selective skipping of specific replications in a multicast procedure. The controller 300 is configured to direct the sequence of data packets to a queue. The queue may be stored onboard the controller 300 or within the memory 302. The queue is a real queue storing the data packets including control information and payload information.

The controller 300 also includes the logical circuitry or hardware for emptying the queue. The queue is emptied according to physical capabilities of the communication path from the output communication interface 305 and the communication path exciting the output communication interface 305. However, the controller 300 may also internally regulate or meter the data flow rate leaving the queue.

The controller 300 is configured to accumulate a count value associated with the queue. The count value may track, in real time or in delayed time, the amount of data that is stored in the queue. The count value is measured in bytes. The count value may be a memory location that stores the current volume of the queue. The count value increases according to the quantity and/or volume of data packets sent to the queue. The count value decreases as data leaves the queue and leaves the network device 101 through the output communication interface 305. The controller 300 may decrease the count value in real time according to the actual amount of data stored in the queue, which may correspond to the data flow rate leaving the queue.

Alternatively, the controller 300 may decrease or decrement the count value according to a shadow rate, which is less than the data flow rate leaving the queue. The shadow rate may be a percentage of the data flow rate leaving the queue. The count value lags the queue based on a difference between the data flow rate leaving the queue and the shadow rate. Because the count value lags the queue according to the shadow rate, the count value may be referred to as a shadow queue.

The controller 300 is configured to compare the count value to a predetermined threshold that provides an indication of the congestion of the queue or an indication of likely future congestion of the queue. The predetermined threshold may be a number of kilobytes (e.g., 100, 500, 1000). The controller 300 may be configured to actively select the predetermined threshold based on testing of output data flow rates. For example, various thresholds may be tested against varying input data rates to select an optimal threshold. Alternatively, the predetermined threshold may be constant. A user may select the predetermined threshold using the workstation 309.

The queue and the count value vary according to the input data rate. When the input data rate is less than the data flow rate leaving the queue, the queue is empty and count value of the shadow queue is zero. When the input data rate is greater than the data flow rate leaving the queue, the real queue increases at a first rate and the virtual queue increases at a second rate with the second rate being greater than the first rate. Therefore, the shadow queue can provide advanced warning that the queue will soon be congested.

The controller 300 replicates incoming data packets according to multicast procedures until the count value reaches or exceeds the predetermined threshold. When the count value reaches or exceeds the predetermined threshold, the controller 300 is configured to drop packets destined for the output communication interface 305, which is the egress port associated with the queue. In other words, the output communication interface 305 receives the sequence of data packets until the count value exceeds the predetermined threshold. Similar comparisons and determination are made simultaneously or sequentially for other count values corresponding to other queues and egress ports. Packets assigned to egress ports having count values below the threshold are forwarded as planned, and packets assigned to egress ports having count values above the threshold are dropped.

Alternatively, packets assigned to egress ports having count values above the threshold may be temporarily stored and the count values checked after a wait time period. In another embodiment, packets assigned to egress ports having count values above the threshold are dropped may be assigned to a different egress ports for forwarding by another network device 101.

In another embodiment, the virtual queue measures a number of the replicated packets sent to a queue or an egress port. In this embodiment, an estimation is made that the packets are generally a constant size. The predetermined threshold for this embodiment is a specific number of data packets. Examples for the predetermined number of data packets include 10, 50, 100, and 1000.

The controller 300 may include a general processor, digital signal processor, an application specific integrated circuit (ASIC), field programmable gate array (FPGA), analog circuit, digital circuit, combinations thereof, or other now known or later developed processor. The controller 300 may be a single device or combinations of devices, such as associated with a network, distributed processing, or cloud computing.

The memory 302 may be a volatile memory or a non-volatile memory. The memory 302 may include one or more of a read only memory (ROM), random access memory (RAM), a flash memory, an electronic erasable program read only memory (EEPROM), or other type of memory. The memory 302 may be removable from the network device 101, such as a secure digital (SD) memory card.

In addition to ingress ports and egress ports, the input communication interface 304 and the output communication interface 305 may include any operable connection. An operable connection may be one in which signals, physical communications, and/or logical communications may be sent and/or received. An operable connection may include a physical interface, an electrical interface, and/or a data interface.

Figure 5:
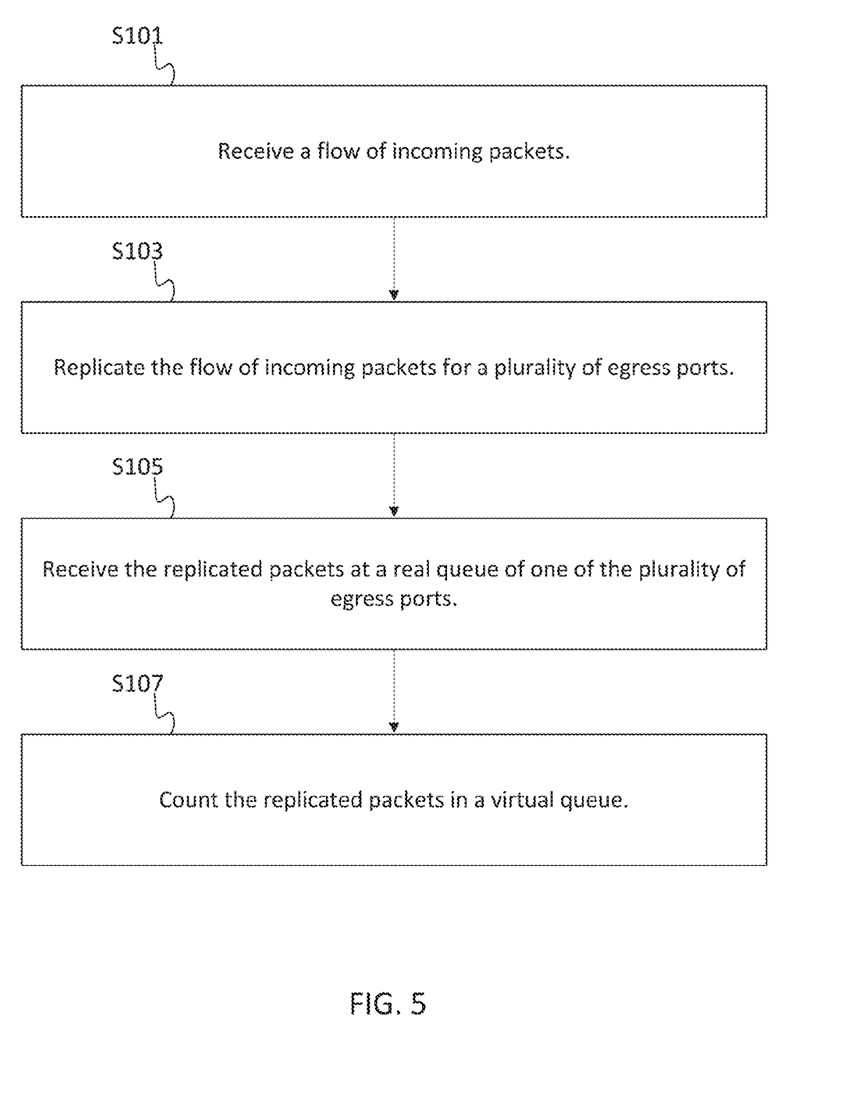
FIG. 5 illustrates an example flowchart for one embodiment of multicast replication skip.

FIG. 5 illustrates an example flowchart for one embodiment of multicast replication skip by the network device 101. At act S101, the network device 101 receives a flow of incoming packets. The flow of incoming packets may be encoded for multicast operation. For example, the packets may include multicast labels. The flow of incoming packets is associated with multiple destinations as specified by the multicast labels.

The network device 101 determines whether or not to replicate and forward a packet to a specific egress port based on the current level of the shadow queue for the specific egress port. The network device 101 compares the shadow queue size to a constant value. The constant value is an amount of data that indicates that the real queue for the egress port is full or will soon be full. The constant value may be any value, such as from 40 kilobytes to 1 megabyte. If the shadow queue size exceeds the constant value, then the network device 101 does not attempt to forward packets to the corresponding egress port. If the shadow queue size is less than the constant value, the network device 101 performs multicast operations as normal.

The multicast operations continue to maintain (increment and decrement) a count value as the shadow queue size to indicate an amount of data in the real queue. At act S103, the network device 101 replicates the flow of incoming packets for egress ports. At act S105, each egress port receives the replicated packets at a real queue of one of the plurality of egress ports.

At act S109, the network device 101 counts the replicated packets in a virtual queue (e.g., shadow queue) as an indication of the amount of data stored in the real queue. The virtual queue approximately lags the real queue because the network device 101 sets a virtual queue drain rate (the rate at which the counter decrements in bytes) to be lower than a real queue drain rate (the rate at which data leaves the real queue). The real queue data rate is constrained by the communication paths of the network device 101 or the network coupled to the network device 101. The virtual queue drain rate is artificially set by the network device 101.

In one example, the real queue and the virtual queue are empty (or at 0 bytes). Packets arrive. One of the real queues is overloaded and accordingly, the virtual queue value is high. The virtual queue drains slower than that the real queue. Therefore, the real queue will become not congested but the virtual queue value is still above zero. In this way, the virtual queue value indicates that an egress port that was recently congested is likely to become congested again. Similarly, the virtual queue value indicates that the real queue is partially full even though no congestion occurs at that time.

In one embodiment, the virtual queue value can increment higher than the maximum capacity of the real queue. Thus, the virtual queue value is a measure of how congested the real queue is or for how long the real queue is likely to remain congested.

The threshold may be selected through simulation. The threshold may be greater than or less than the capacity of the real queue. The simulation may measure actual congestion and the responsiveness of the shadow queue value. If the threshold is selected higher, fewer packets are initially dropped, but more blocking occurs. The system will be more tolerant to bursty traffic, i.e. traffic whose average rate is low, but instantaneous rate is high. If the threshold is selected lower, more packets are dropped, which may include unnecessarily dropped packets. If the threshold is too low then overall throughput may be maximized, at the expense of the throughput of a subset of the flows. Bursty traffic results in more dropped packets.

Figure 6:
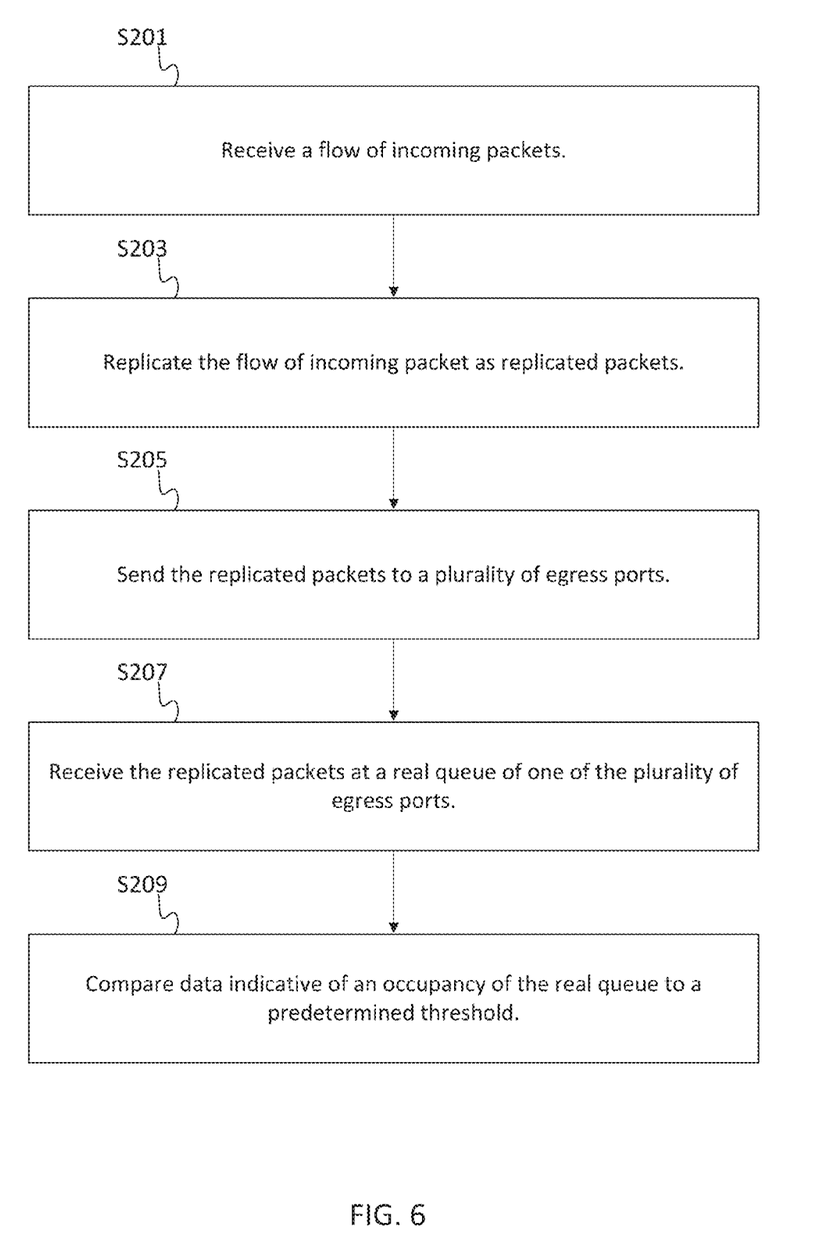
FIG. 6 illustrates an example flowchart for another embodiment of multicast replication skip.

FIG. 6 illustrates an example flowchart for another embodiment of multicast replication skip. Multicast replication skip in the embodiment of FIG. 6 may be triggered by either a current reading on the capacity of a real queue or the leading indicator of a virtual queue, shadow queue, or proxy queue.

At act S201, the controller 300 receives a flow of incoming packets. The flow may be a sequence of packets used in streaming media. The controller 300 distributes the flow of packets to multiple egress ports by replicating the flow of incoming packet at act S203 and sending the replicated packets to multiple egress ports at act S205.

Each of the egress ports is fed by a queue. The queue is a small portion of memory that temporarily holds a series of packets, including control information and payload information, until the associated egress port is ready to forward the next packet in line. At act S207, the egress port receives the replicated packets from the queue.

Each of the queues also includes a counter. The counter records data indicative of an occupancy of the real queue. At act S209, the controller 300 is configured to compare the occupancy of the real queue to a predetermined threshold. The controller 300 drops packets that are to be forwarded to ports associated with occupancy data for the queue exceeds the predetermined threshold and forwards packets that are to be forwarded to ports associated with occupancy data less than the predetermined threshold.

In one embodiment, the counter measures the current amount of data stored in the queue in real time. The predetermined threshold may be set at a percentage (e.g., 50%, 80%, 90%, 98%) of the capacity of queue. In this embodiment, the data indicative of the occupancy of the real queue is a real time volume of the real queue.

In another embodiment, the counter also measures the amount of data stored in the queue, but differs from the real time amount. The controller 300 is configured to count the replicated packets in a virtual queue as the data indicative of the occupancy of the real queue. For example, the counter may be incremented at the same rate that the data is stored in the queue but decremented at a different rate. The counter may be decremented at a percentage of the drain rate of the queue. The drain rate of the counter may be set to any percentage of the drain rate of the queue. Accordingly, the counter is a measure of long term congestion because the counter value remains positive even after a previously congested queue has emptied. The indication of long term congestion accumulates over time and provides an indication that future congestion will occur.

The example network device 101 may also be configured detection and control of fabric congestion using shadow queues. The fabric is a network topology in which network nodes connect with each other via network switches or cross bar switches. The fabric may be in a single device having multiple nodes within or a network of devices, each functioning as a node.

The network device 101 may be a node in a network. The network device 101 may be a node within a switch. The network device may be a destination node or a source node, or include both the destination node and the source node. Generally, the source node sends traffic to the destination node through a variety of paths. A periodic series of packets from the destination node to the source node include data indicative of an acceptable amount of traffic to send. The acceptable amount of traffic may be measured in packets (quantity), bandwidth (bits/second), or total volume (bytes). The destination node defines that acceptable amount of traffic such that it does not exceed the speed of the link between the source node and the destination node.

There may be multiple communication paths transverse multiple intermediate nodes between the source node and the destination node. The intermediate nodes may have different levels of congestion. When any individual node gets too congested, packets are dropped.

Each of the intermediate nodes includes a real queue and a shadow queue as an indication of the congestion of the real queue or an indication of likely future congestion of the real queue. The shadow queue is drained at a rate slower than the throughput of the node.

Figure 7:
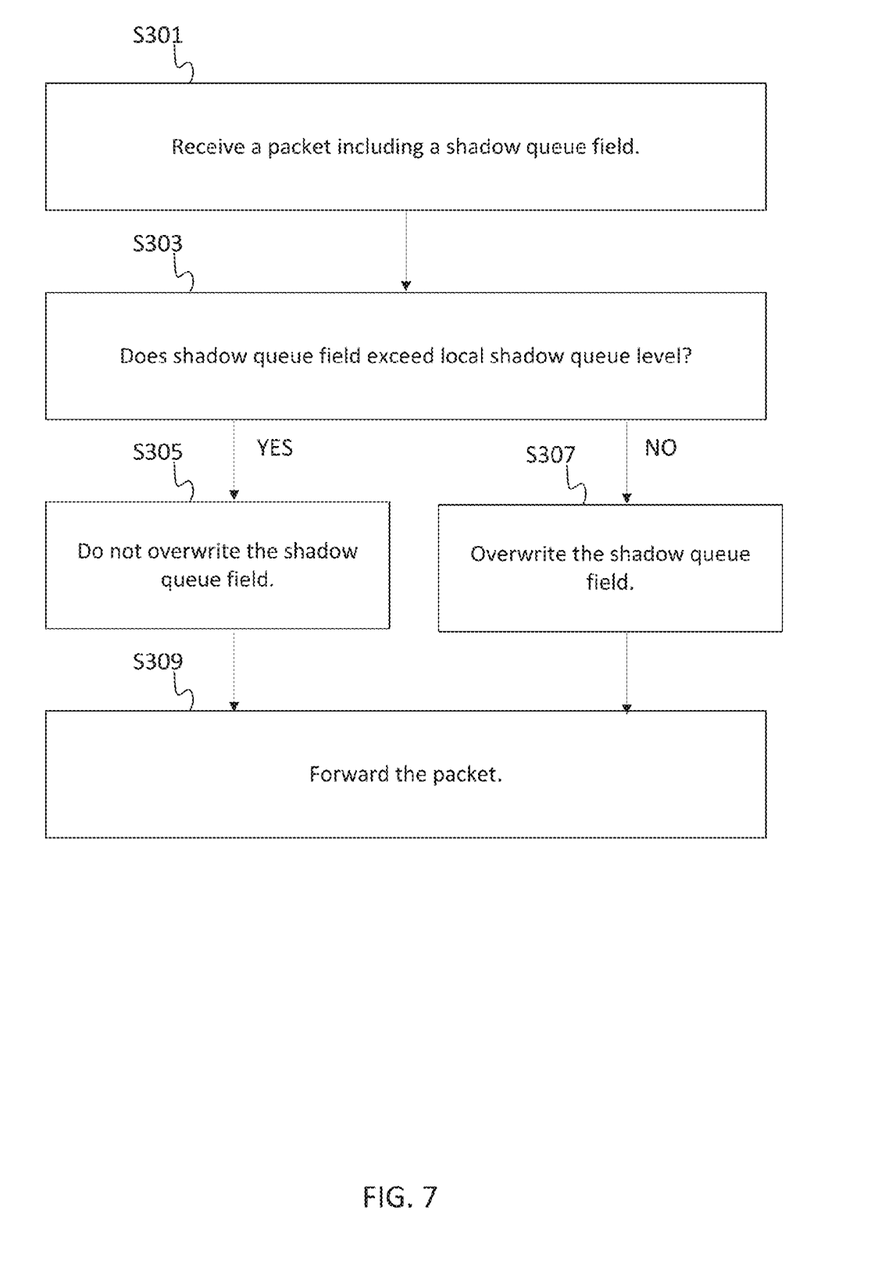
FIG. 7 illustrates an example flow chart for fabric congestion detection and control using shadow queues.

FIG. 7 illustrates an example flow chart for fabric congestion detection and control using shadow queues. The source node is configured to generate packets include a shadow queue field. At act S301, an intermediate node receives a packet including a shadow queue field. At act S303, the intermediate node compares the shadow queue field to the local shadow queue value of the intermediate node. If the shadow queue field is empty or zero, the intermediate writes the local shadow queue value to the shadow queue field. At act S307, if the shadow queue field is less than the local shadow queue value, the intermediate writes the local shadow queue value to the shadow queue field. At act S305, if the shadow queue field is equal or greater than the local shadow queue value, the intermediate node does nothing, or at least does not overwrite the shadow queue field of the packet. Regardless, the intermediate node forwards the packet at act S309. The packet may pass through one or more intermediate nodes on the path to the destination node. The process collects the shadow queue value of the most congested intermediate node, which may be referred to as the bottleneck node.

The destination node is configured to read the shadow queue field from the packet. The destination node may compare the shadow queue field to a threshold. Generally, if the shadow queue field is below the threshold, no congestion is present or predicted and no feedback is sent to the source node. However, if the shadow queue field exceeds the threshold the destination node may take one or more possible actions.

First, the destination node may send a message to the source node requesting a decrease in the number of packets or the size of the packets forwarded. In addition, the destination node may accumulate shadow queue field values from multiple paths and average the values to reduce noise or outliers.

The average value may be used to send feedback to the source node according to a control law. An example control law is shown in Equation 1.

$$\text{Rate} = \text{PortRate} * [1 - (\text{SQLevel} - \text{threshold})/A]  \qquad \text{Eq 1.}$$

The Rate is the rate communicated from the destination node to the source node for future traffic. The Rate may be delay by the round trip time to traverse the network or switch. The PortRate is the rate of one of the links connecting the destination node to the next network device (switch, router, or destination workstation). The SQLevel is the averaged value (or singular value) received by the destination node. The threshold is the shadow queue level above which a slowdown is required to control fabric congestion. A is the inverse gain (1/A is the gain) of the control law. A is set according the maximum difference between the SQLevel and the threshold. A may be selectable and configurable by a user. A is chosen in order to ensure stability of the control loop while also minimize response time to varying traffic conditions. In general, choosing a larger inverse gain A results in greater stability, but leads to slower response time.

The intermediate node may execute Equation 1 only when the SQLevel exceeds the threshold. If the SQLevel is less than the threshold, the intermediate node simple asks the source node to send packets at the link rate or the rate of the destination node. Otherwise, Equation 1 provides that as the SQLevel goes from zero to a maximum, the Rate communicated from the destination node to the source node goes from the link rate or destination node rate down to zero. Equation 1 is a negative feedback loop that causes the network or network switch to reach equilibrium.

The network may include wired networks, wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A method comprising: receiving a flow of incoming packets;
replicating the flow of incoming packets for a plurality of egress ports; receiving the replicated packets at a real queue of one of the plurality of egress ports; and counting the replicated packets in a virtual queue as an indicator of congestion in the real queue, wherein a first service rate (R) associated with the real queue and a second service rate (X) is associated with the virtual queue according to $X = R*(1-\epsilon)$, wherein $\epsilon$ is a value between 0 and 1 and $(1-\epsilon)$ is a constant ratio, comparing a count value for the virtual queue to a threshold; and dropping packets at the real queue when the count value for the virtual queue exceeds a threshold.

2. The method of claim 1, further comprising: comparing a quantity in the virtual queue to a predetermined threshold; and dropping one or more replicated packets destined for the one of the plurality of egress ports in response to the virtual queue exceeding the predetermined threshold.

3. The method of claim 1, wherein the virtual queue measures a number of the replicated packets sent to the one of the plurality of egress ports.

4. The method of claim 1, wherein the virtual queue measures an amount of data of in the replicated packets sent to the one of the plurality of egress ports.

5. The method of claim 1, wherein a count in the virtual queue lags a volume of the real queue in time based on a difference between the first service rate and the second service rate.

6. The method of claim 1, where ¼, ⅛, Pi/4, or 1/32.

7. The method of claim 1, wherein when X is less than R over time, the real queue is empty and a quantity value of the virtual queue is zero, and wherein when X is greater than R over time the real queue increases more quickly than the virtual queue.

8. The method of claim 1, wherein the virtual queue tracks the occupancy of the real queue.

9. The method of claim 1, wherein the indicator of congestion indicates future congestion when the count value is above zero and the real queue is empty.

10. The method of claim 1, wherein the indicator of congestion indicates future congestion when the count value is increasing and the real queue is empty.

11. A network device comprising: an input communication interface configured to receive a sequence of data packets; a controller configured to direct the sequence of data packets to a queue having a first service rate and accumulate a count value associated with the queue according to an amount of data in the sequence of data packets, wherein the count value is stored in a shadow queue having a second service rate; and an output communication interface that receives the sequence of data packets until the count value exceeds a predetermined threshold, wherein the controller is configured to replicate data packets destined for the output communication interface when the count value is less than the predetermined threshold and configured to drop data packets destined for the output communication interface when the count value is greater than the predetermined threshold, wherein the second service rate (X) is associated with the first service rate (R) according to $X = R*(1-\epsilon)$, wherein $\epsilon$ is a value between 0 and 1.

12. The network device of claim 11, wherein the first service rate describes a rate that data exits the queue.

13. The network device of claim 11, wherein the shadow queue is configured to store the count value and lag the queue based on a difference between the second service rate and the first service rate.

14. A non-transitory computer readable medium containing instructions that when executed are configured to: receive a flow of incoming packets; replicate the flow of incoming packet as replicated packets; send the replicated packets to a plurality of egress ports; receive the replicated packets at a real queue of one of the plurality of egress ports, wherein the real queue drains at a first rate; track an occupancy of the virtual queue that drains at a second rate, wherein the second rate (X) is associated with the first rate (R) according to $X = R*(1-\epsilon)$, wherein $\epsilon$ is a value between 0 and 1; and compare data indicative of the occupancy of the real queue to a predetermined threshold; and drop packets at the real queue when the occupancy of the virtual queue exceeds the predetermined threshold.

15. the non-transitory computer readable medium of claim 14, the instructions further configured to: count the replicated packets in a virtual queue as the data indicative of the occupancy of the real queue.

16. the non-transitory computer readable medium of claim 14, wherein the data indicative of the occupancy of the real queue is a real time volume of the real queue.

* * * * *